United States Patent
Hicks, Jr.

(10) Patent No.: US 9,534,886 B1
(45) Date of Patent: Jan. 3, 2017

(54) LASER MEASURING SYSTEM FOR JOINTS OF PIPES

(71) Applicant: Bobby Frank Hicks, Jr., Garland, TX (US)

(72) Inventor: Bobby Frank Hicks, Jr., Garland, TX (US)

( * ) Notice: Subject to any disclaimer, the term of this patent is extended or adjusted under 35 U.S.C. 154(b) by 0 days.

(21) Appl. No.: 15/233,815

(22) Filed: Aug. 10, 2016

Related U.S. Application Data

(60) Provisional application No. 62/313,895, filed on Mar. 28, 2016.

(51) Int. Cl.
| | | |
|---|---|---|
| *G01B 11/00* | (2006.01) | |
| *E21B 49/00* | (2006.01) | |
| *G01B 11/04* | (2006.01) | |

(52) U.S. Cl.
CPC .............. *G01B 11/043* (2013.01); *E21B 49/00* (2013.01)

(58) Field of Classification Search
CPC ......... G01B 11/00; G01B 11/26; G01B 17/00; G01B 5/0002; G01B 5/0004; G01B 7/12; G01B 11/043; G01N 2291/044; E21B 49/00
See application file for complete search history.

(56) References Cited

U.S. PATENT DOCUMENTS

| | | | | |
|---|---|---|---|---|
| 7,197,837 | B1* | 4/2007 | Blanford | G01B 5/003 33/555.1 |
| 9,014,871 | B2* | 4/2015 | Luebke | G08G 1/017 340/431 |
| 9,170,089 | B2* | 10/2015 | Logan | G01B 11/00 |
| 2004/0016139 | A1* | 1/2004 | Lam | G01B 11/105 33/544 |
| 2011/0072905 | A1* | 3/2011 | Lam | G01N 29/221 73/622 |
| 2011/0138920 | A1* | 6/2011 | Sauerland | G01B 11/0666 73/627 |
| 2013/0160309 | A1* | 6/2013 | Logan | G01B 11/00 33/228 |
| 2016/0312553 | A1* | 10/2016 | Zhao | E21B 21/08 |

* cited by examiner

*Primary Examiner* — Sang Nguyen
(74) *Attorney, Agent, or Firm* — Buskop Law Group, PC; Wendy Buskop

(57) ABSTRACT

A laser measuring system for continuous measurement of at least one join of pipe being inserted into or removed from a wellbore. The laser measuring system can have a laser housing with a laser surface velocimeter. The laser housing with a laser arm can be connected to a support member with an upper mounting member and an upper rubber pipe wiper and a lower plate with a lower rubber pipe wiper. The laser surface velocimeter can communicate via a network to a computer processor and data storage for measuring pipe joint length in real time. A pressurized gas port can pressurize the laser housing above ambient pressure to keep a laser beam clear of particulate and well fluids. The laser beam used to detect and calculate length and quantity of joints of pipe moving past the laser beam transmitting the information to the computer processor real time.

18 Claims, 9 Drawing Sheets

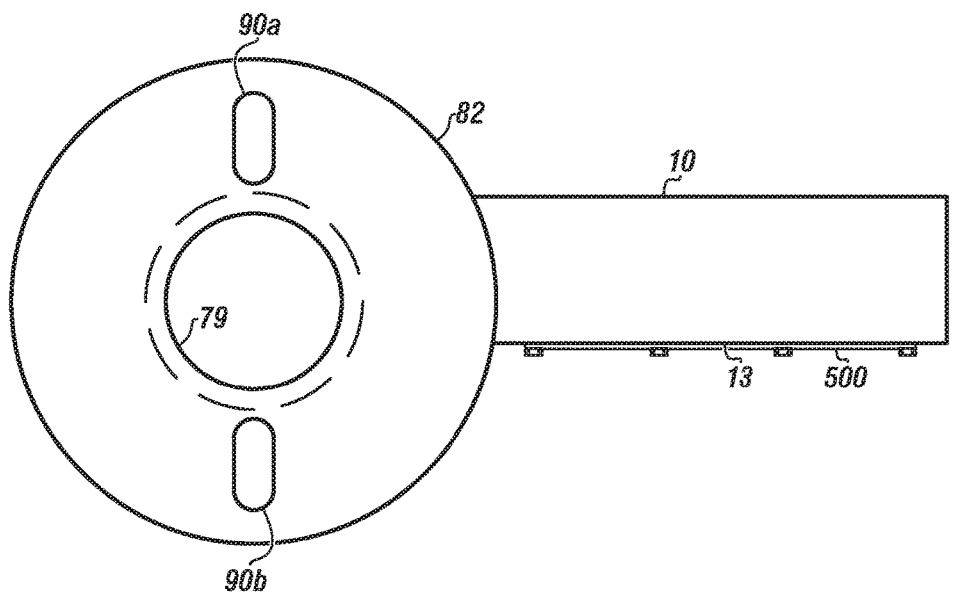
FIGURE 2B
FIGURE 2C
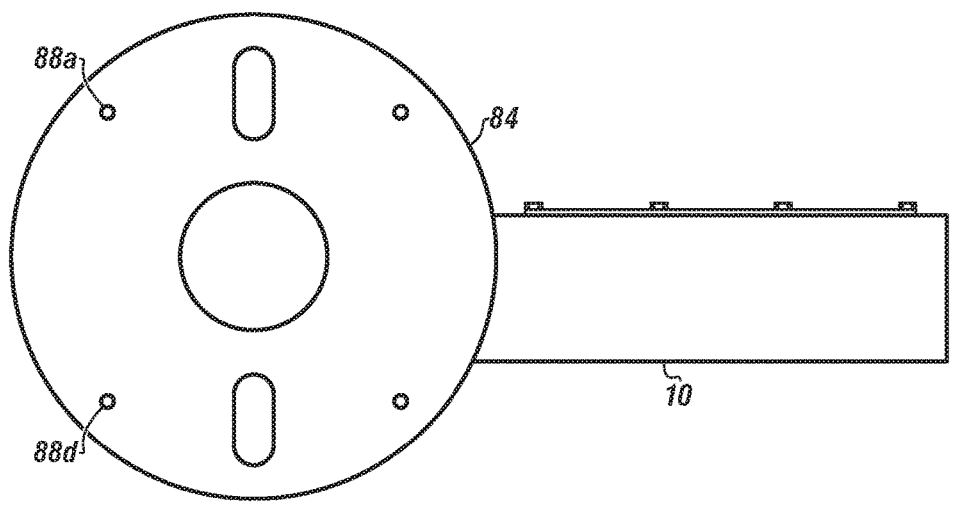

| LASER DATA STORAGE | 25 |
| COMPUTER INSTRUCTIONS TO INSTRUCT THE LASER PROCESSOR TO COMPUTE THE LENGTH OF EACH JOINT OF PIPE BEING RUN INTO AND OUT OF THE WELLBORE | 103 |

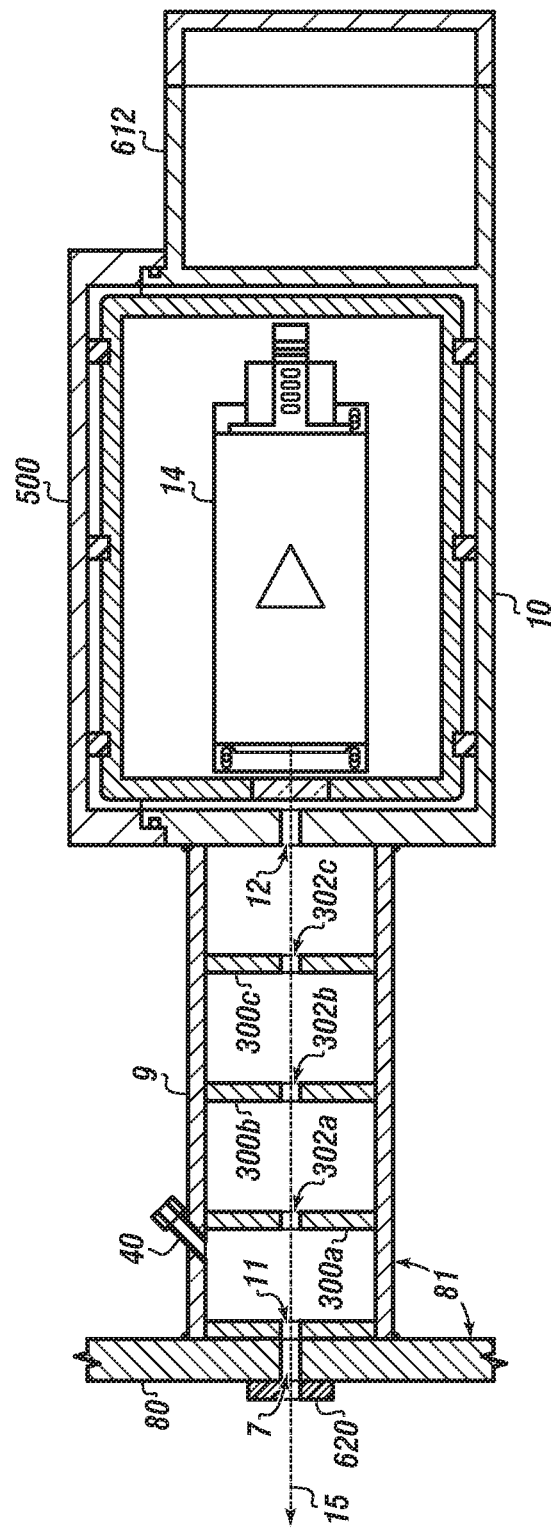

LASER MEASURING SYSTEM FOR JOINTS OF PIPES

CROSS REFERENCE TO RELATED APPLICATION

The current application claims priority to and the benefit of U.S. Provisional Patent Application Ser. No. 62/313,895 filed on Mar. 28, 2016, entitled "LASER MEASURING SYSTEM FOR TUBULARS". This reference is incorporated in its entirety herein.

FIELD

The present embodiments relate to a laser measuring system for continuous measurement of joints of pipes being removed from or inserted into a wellbore.

BACKGROUND

A need exists for an automated, remote controlled laser measuring system for use with joints of pipes in real time as the joints of pipes are pulled from a wellbore or inserted into a wellbore.

A further need exists for an accurate controllable laser measuring system with a housing supported off the ground and surrounding the joints of pipes being removed from or inserted into a wellbore.

The present embodiments meet these needs.

BRIEF DESCRIPTION OF THE DRAWINGS

The detailed description will be better understood in conjunction with the accompanying drawings as follows:

FIGS. 2A-2D depict views of a laser measuring assembly according to one or more embodiments.

FIG. 3 depicts a laser data storage according to one or more embodiments.

FIG. 6 depicts a laser arm connected to a laser housing according to one or more embodiments.

Figure 1:
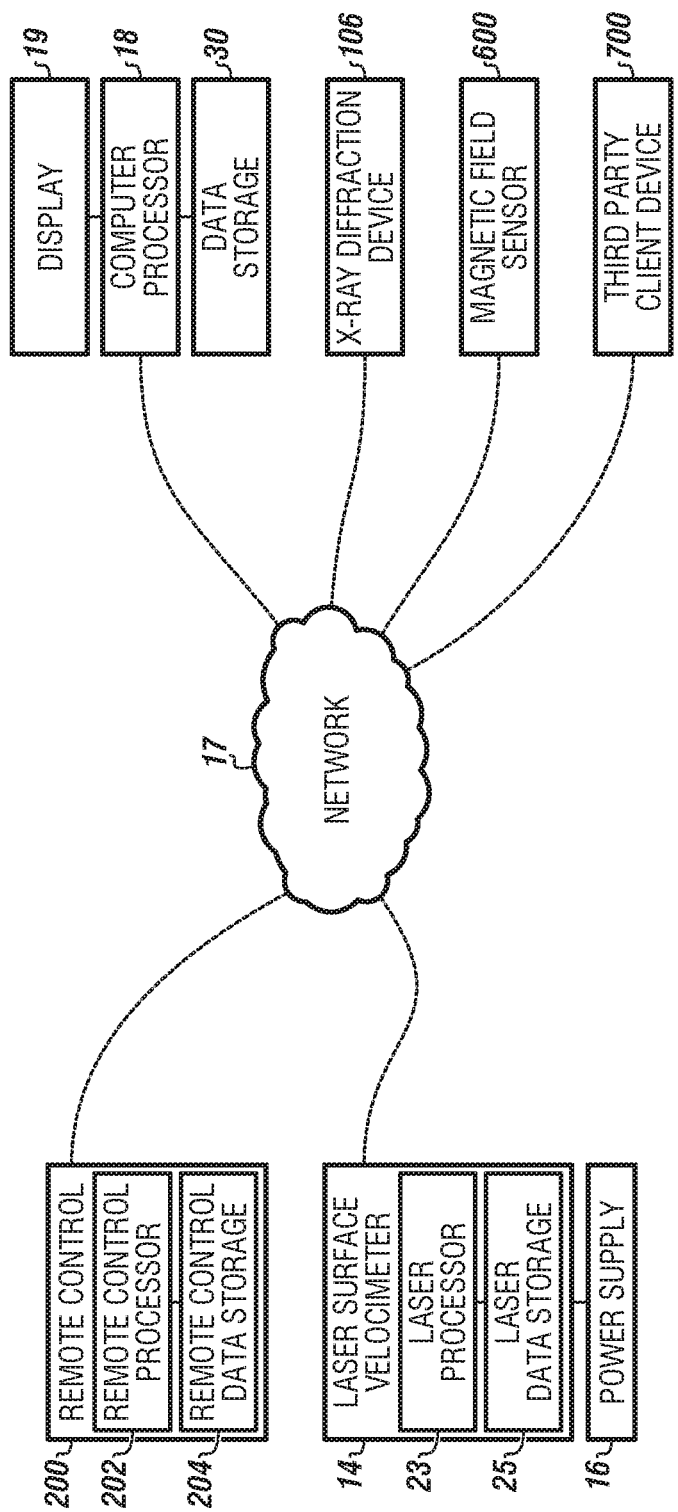
FIG. 1 is an overview of the laser measuring system according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The embodiments generally relate to a laser measuring system for joints of pipes.

The laser measuring system can measure and calculate joints of pipe length as the joints of pipe are inserted into a wellbore, such as in a hostile environment with heat, corrosives, mud, water, poor weather conditions, arctic conditions, and acidic conditions.

The laser measuring system can measure and calculate joints of pipe length as the joints of pipe is pulled out of the wellbore, such as in a hostile environment with heat, corrosives, mud, water, poor weather conditions, arctic conditions, and acidic conditions.

The laser measuring system is capable of measuring and performing calculations of connected joints of pipes both into and out of a wellbore.

The laser measuring system can provide an environmental advantage to minimize toxic fumes emanating from a wellbore by containing the volatile organic compounds, which can include toxic gases, from releasing from a wellbore using a dual sealing system as connected joints of pipes are removed from the wellbore.

The embodiments further relate to a laser measuring system for continuous measurement of joints of pipes being removed from or inserted into a wellbore.

The laser measuring system can have a laser housing containing a laser surface velocimeter.

The laser housing can mount directly or via a laser arm to a support member with an upper mounting member and an upper rubber pipe wiper on one end and a lower plate with a lower rubber pipe wiper on an opposite end.

Joints of pipe can travel through a center hole of the support housing aligned with the center hole of each of the upper and lower rubber pipe wipers.

In embodiments, a laser surface velocimeter can project a laser beam at each joint of pipe to measure a length of pipe and calculate a total length of connected joints of pipe being installed in or pulled out of a wellbore. In embodiments, the laser surface velocimeter can be diposed between the upper and lower rubber pipe wipers.

The laser surface velocitmeter can communicate via a network to a computer processor and a data storage for carefully calculating measured pipe joint length in real time and a quantity of pipe joints sunk into or pulled out of a wellbore.

A pressurized gas port can pressurize the laser housing and/or laser arm above ambient pressure to keep the laser beam clear of particulate and well fluids as joints of pipe are pulled through the support member and upper and lower rubber pipe wipers.

The laser beam can be used to detect and calculate length and quantity of joints of pipe moving past the laser beam, wherein the data and/or information can be transmitted to a computer, processor and/or data storage.

The term "data storage" as used herein refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "gas port" as used herein can refer to an insert gas port, such as air, nitrogen, or another non-explosive non-toxic gas.

The term "joints of pipe" or "at least one joint of pipe" as used herein can refer to tubing, casing, or any type of pipe known in the industry. In embodiments, the joints of pipe can be at least one joint of pipe. In embodiments, the joints of pipe can be a plurality of connected joints of pipes.

The term "real time" as used herein can refer to an update of information at the same rate the information is received, such as 24 hours a day, 7 days a week.

The term "rubberized pipe wiper" as used herein can refer to a rubber material, an elastomeric material, or similar flexible disc shaped material, which can be made from a flexible, durable, impact resistant material that optionally can swell in the presence of water, such as the rubber used on the exterior of swell packers used in the industry.

Turning now to the Figures, FIG. 1 depicts the laser measuring system according to one or more embodiments.

The laser measuring system 8 can be used for continuous measurement and calculation of lengths of joints of pipes being removed from or inserted into a wellbore.

The laser measuring system 8 can be used to continuous measurement and calculation of lengths of connected joints of pipe being removed from or inserted into a wellbore.

The laser measuring system can be used to count joints of pipe as they are separately inserted into or pulled from a wellbore.

Optionally, the laser measuring system can be used for continuous measurement of a velocity at which the joints of pipes are being removed from or inserted into a wellbore.

The laser measuring system 8 can ensure a clean, debris-free and fluid-free surface for laser beam impact on each individual joint of pipe.

The laser measuring system 8 can include a laser surface velocimeter 14.

The laser surface velocimeter can be a non-contact optical speed sensor measuring velocity and length on moving surfaces. The laser surface velocimeter can use the laser Doppler principle to evaluate the laser light scattered back from a moving object, such as a joint of pipe.

In embodiments, the laser surface velocimeter 14 can have a laser processor 23, which can be connected to a laser data storage 25.

The laser surface velocimeter 14 can connect to a power supply 16, wherein the power supply can be mounted to a component of the laser measuring system.

In embodiments, the power supply can be any known type of power supply, such as a fuel cell, a battery, a battery pack, or a rechargeable energy storage device.

In embodiments, the power supply 16 can be in wired or wireless connection with the laser surface velocimeter 14.

The laser surface velocimeter 14 can measure, calculate and transmit calculations of lengths of joints of pipe and lengths of connected joints of pipe to a network 17.

The laser surface velocimeter 14 can be remotely controlled by a remote control 200, which can be connected to the network 17.

The remote control 200 can be a computer or a client device, such as a cellular phone, a smart phone, a tablet computer, a computer, a laptop, or similar device known in the industry.

The remote control 200 can receive additional information from at least one third party client device 700, wherein the at least one third party client device can be connected to the network 17.

The remote control 200 can have a remote control computer processor 202, which can be connected to a remote control data storage 204.

The network can be any known network in the industry, such as a satellite network, a global communication network, a cellular network, a local area network, a wide area network, a fiber optic network, or combinations thereof.

The laser measuring system 8 can have a computer processor 18, such as an administrative processor, which can be connected to a data storage 30, such as an administrative data storage both of which can communicate with the laser surface velocimeter 14 via the network 17.

The data storage 30 can contain various computer instructions and data which can instruct the computer processor or another processor to receive, calculate, and store the measured lengths of joints of pipe, optional pipe velocities and present calculations representing total lengths of connected joints of pipe lengths on a display 19. In embodiments, the display can be a digital display.

The computer processor can present the measured joints of pipe lengths and calculate total length of connected joints of pipe, which can be seen on the display 19 in real time or as continuously updated.

In embodiments, an x-ray diffraction device 106 can communicate with the laser surface velocimeter 14 via the network 17 and to the computer processor 18. In embodiments, the x-ray diffraction device can communication simultaneously with the surface velocimeter and the computer processor.

The x-ray diffraction device 106 can provide information on detected fractures, cracks and other flaws in each joint of pipe as the connected joints of pipe are withdrawn from or inserted into the wellbore.

In embodiments, the remote control 200 can connect to the laser processor 23 for a user to remotely actuate the laser surface velocimeter 14 through the network 17 from a geographic location remote to the laser surface velocimeter 14.

In embodiments, the processors and data storages can be computers or cloud based processors and data storages.

In embodiments, the laser measuring system can include a magnetic field sensor 600.

The magnetic field sensor 600 can be secured or installed proximate to the laser surface velocimeter 14 to detect magnetic field build up as joints of pipe are removed from or inserted into the wellbore.

The magnetic field sensor 600 can communicate with the computer processor 18 via the network 17.

The magnetic field sensor 600 can provide an alarm when magnetic fields exceed a preset limit. The magnetic field preset limits can be stored in the data storage 30.

In embodiments, the computer processor 18, the laser processor 23, the remote control 200, the magnetic field sensor 600, and combinations thereof can communicate to or be in communication with at least one third party client device 700 or multiple third party client devices.

The at least one third party client device 700 can be connected to the network 17. In embodiments, the at least one third party client device 700 can allow multiple laser surface velocimeters to be monitored simultaneously from a remote location.

The third party client device 700 can receive information from the multiple laser processors, computer processors, and laser surface velocimeters simultaneously for management operations of multiple laser measuring assemblies simultaneously.

The at least one third party device can be a computer, a cellular phone, a tablet computer or similar computing device with bidirectional communication to the network 17.

FIGS. 2A-2D depict a laser measuring assembly according to one or more embodiments.

Referring to FIGS. 2A, 2B, 2C and 2D, in embodiments, the laser measuring assembly can have a laser housing 10. In embodiments, the laser housing 10 can be hollow with a hinged lid, or removable side wall or removable end wall.

In embodiments, the laser housing 10 can be rectangular or square in shape.

In embodiments, the size of the laser housing has to be adequate to contain a laser beam producing device.

The laser housing 10 can have at least one protection wall 300a. The at least one protection wall 300a can have an aperture 302a aligned with a laser beam 15 emitted by the laser surface velocimeter 14.

The aperture 302a can be an opening, a slit, a perforation, a hole, a plurality of holes or a plurality of openings that can enable the laser beam 15 produced by the laser surface velocimeter 14 to project from the laser housing 10 onto at least one joint of pipe 6 being pulled from or inserted into a wellbore 1.

The laser housing 10 can have a sealable opening 13. The sealable opening 13 needs to be large enough to enable insertion of the laser surface velocimeter 14 or large enough to enable repair of the laser surface velocimeter 14, without removing the laser surface velocimeter from the laser housing.

The sealable opening 13 can be closed with a hinged door 500, which can be secured to the laser housing 10.

In embodiments, the hinged door 500 can be a lid with fasteners.

In embodiments, the hinged door 500 can secure the laser housing 10 over the sealable opening 13.

In embodiments, the laser housing 10 can contain the laser surface velocimeter 14 and can optionally contain an onboard power supply.

The laser surface velocimeter 14 can be oriented to project the laser beam 15 directly from the laser surface velocimeter 14, or optionally from the laser surface velocimeter 14 through the aperture 302a in the at least one protection wall 300a to impact connected joints of pipe being inserted into or removed from the wellbore 1.

Optionally, the laser surface velocimeter 14 can be used to detect and calculate a velocity of each joint of pipe moving past the laser beam 15 in real time as well as to detect and calculate a length of each joint of pipe moving past the laser beam 15.

A pressurized gas port 40 can be formed through the wall of the laser housing 10 for receiving a pressurized gas 44, which can be pressurized air from a rig or pressurized gas, such as inert gas, from a standalone pressurized gas cylinder, and provide an increased gas pressure into the laser housing 10 by at least 5 percent above ambient pressure.

In embodiments, the laser beam can be reflected with mirrors onto the surface of each joint of pipe, and the connection can be at any angle, other than a right angle, and as low as forty-five degrees.

A support member 80 can have a center hole 79. The center hole 79 can be positioned over the wellbore 1. In embodiments, the support member 80 can be from seven inches to forty-eight inches in height.

In embodiments, the center hole 79 can range in diameter from one inch to sixteen inches.

The support member 80 can be connected between an upper mounting member 82 and a lower plate 84. In embodiments, the support member can be a hollow cylinder.

The upper mounting member 82 and the lower plate 84 can have diameters ranging from five inches to thirty-six inches.

The upper mounting member 82 and the lower plate 84 can each have a thickness from one-fourth of an inch to five inches.

The upper mounting member 82 and the lower plate 84 can each have a central hole for receiving and passing joints of pipe. The diameters of these central holes can range from two inches to eighteen inches.

In embodiments, the upper mounting member and the lower plate can be round or circular, but can also have other shapes.

In embodiments, the upper mounting member and the lower plate can have identical outer diameters. In embodiments, the upper mounting member and the lower plate can have different sized outer diameters.

The support member 80 can have a wall thickness needed to hold from 40,000 pounds to 85,000 pounds of weight.

In embodiment, optionally, a plurality of upper fastener holes 90a-90b can be used to secure the upper mounting member 82 to additional oil field equipment.

If upper fastener holes are used, the diameters of the upper fastener holes can range from one-fourth of an inch to two inches.

In embodiments, from two upper fastener holes to twelve upper fastener holes can be used.

In embodiments, optionally, a plurality of lower fastener holes 88a-88d can be formed through the lower plate 84 for connecting the lower plate 84 to wellhead equipment or providing a freestanding alignment with the wellbore 1 above the wellhead equipment.

In embodiments, the lower plate can connect to a blowout preventer 101.

The plurality of lower fastener holes 88a-88d can have diameters that range from one-fourth of an inch to two inches.

In embodiments from two lower fastener holes to twelve lower fastener holes can be used. In embodiments, the fasteners can be bolts.

The support member 80 can have a first laser beam opening 7 formed in the support member 80 penetrating to the center hole 79.

In embodiments, a laser arm 9 can have a second laser beam opening 11, which can be aligned with the first laser beam opening 7. The laser arm 9 can be connected to and aligned with the laser housing 10.

In embodiments, the laser arm 9 can be connected to the support member 80 at an angle 81.

In embodiments, the at least one protection wall 300a can be mounted within the laser arm having the aperture 302a enabling the laser beam 15 to penetrate through the aperture 302a to at least one joint of pipe 6 being withdrawn from or inserted into the wellbore 1.

The angle 81 can be a ninety degree angle or an angle from 80 degrees to 120 degrees, as long as the laser beam can impact each joint of pipe at approximately a right angle.

In embodiments, the angle 81 can be a right angle or an angle other than a right angle, so long as the angle used enables the laser beam 15 to impinge the at least one joint of pipe 6 passing through the center hole 79 of the support member 80.

An upper rubber pipe wiper 100 can be mounted on the upper mounting member 82 and a lower rubber pipe wiper 102 can be mounted on the lower plate 84.

With the dual rubber pipe wiper configuration, the laser measuring system can create a dual cleaning system between the upper mounting member and the lower plate to ensure the laser beam 15 is given a debris-free and fluid-free reading surface on each joint of pipe.

The rubber pipe wipers ensure equipment to which the upper mounting member and the lower plate are attached stay free of debris and well fluids.

At least one nozzle 400a and 400b can be used for blowing on the pressurized gas port 40 and penetrating the laser housing 10. The at least one nozzle 400a and 400b can project pressurized gas, such as air, in a different direction simultaneously. The at least one nozzle 400a and 400b can cause movement of particulate in the laser housing 10 and cleaning of particulate away from the laser surface velocimeter 14.

The laser measuring assembly can have the magnetic field sensor 600, which can be used to detect and transmit magnetic field measurements as the at least one joint of pipe 6 passes the laser housing 10 and can optionally provide an alarm to a third party client device connected to the magnetic field sensor via the network when magnetic fields exceed a preset limit.

In embodiments, the laser measuring assembly can have the x-ray diffraction device 106 mounted to and in tandem with the laser surface velocimeter 14. The x-ray diffraction device can be used for projecting an x-ray beam in tandem and simultaneous with the laser beam at the at least one joint of pipe being pulled from or inserted into the wellbore 1. The x-ray diffraction device can detect fractures in the joints of pipe in real time.

Figure 2A:
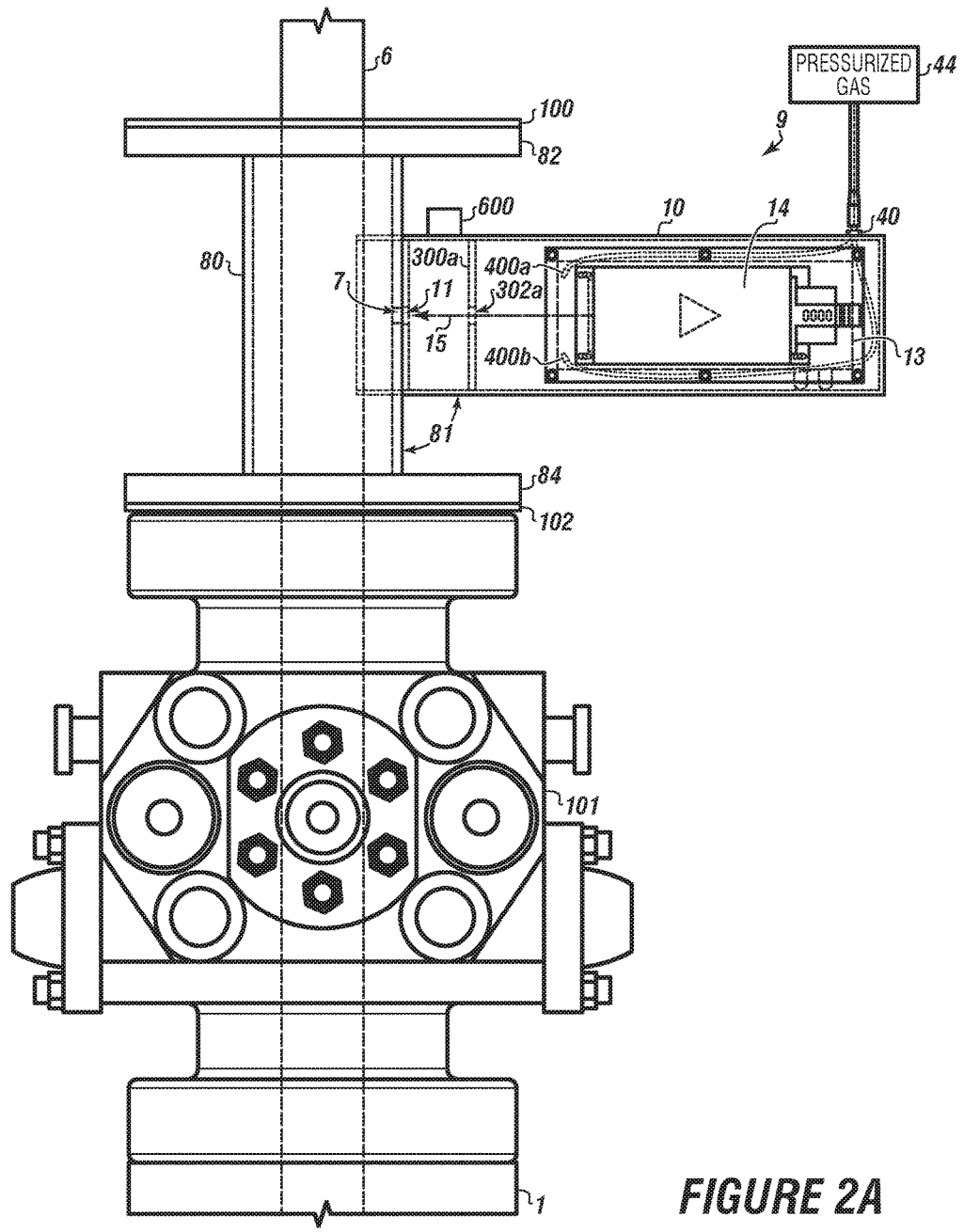
Figures 2D, 3:
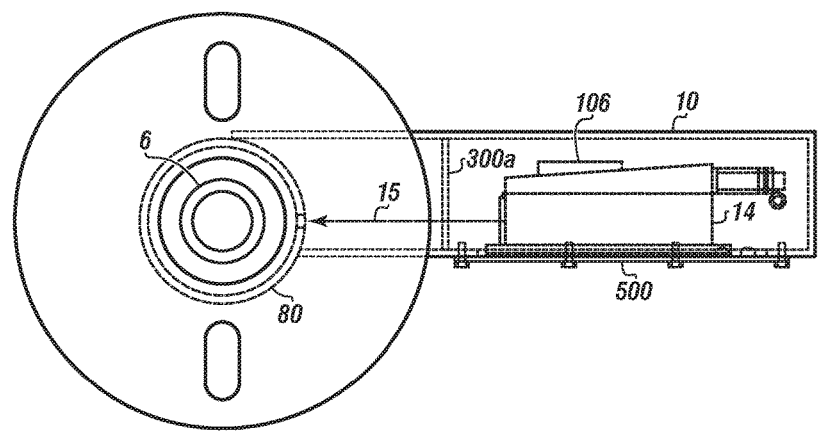

FIG. 3 depicts a laser data storage according to one or more embodiments.

The laser data storage 25 can include computer instructions 103 to instruct the laser processor to compute the length of each joint of pipe being run into and out of the wellbore.

In embodiments, the laser data storage can include computer instructions to instruct the laser processor to actuate the laser beam and use reflected laser beam frequencies to calculate a velocity and a length of each joint of pipe being run into and out of the wellbore.

Figure 4:
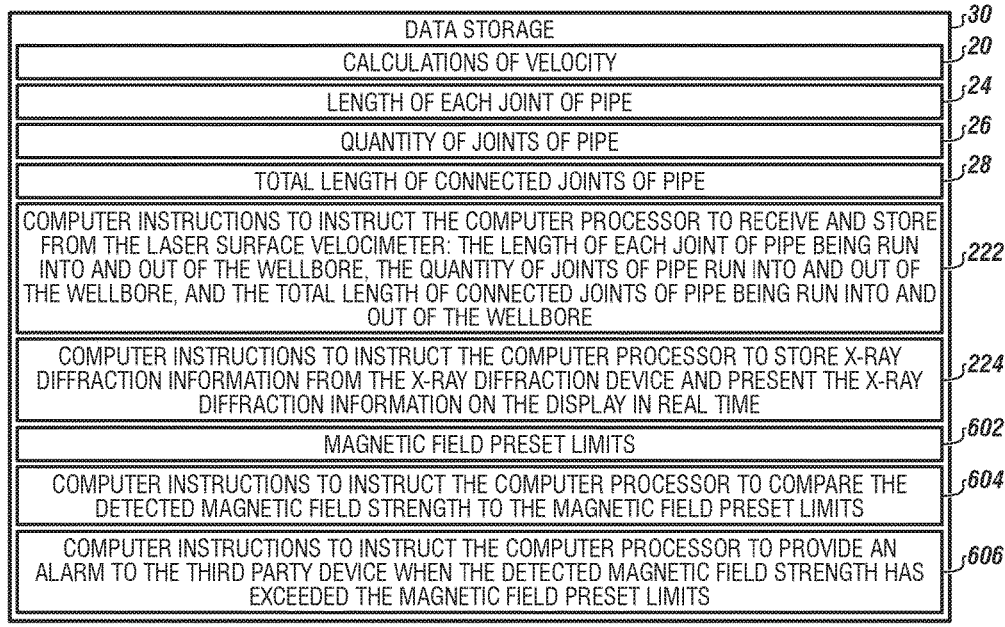
FIG. 4 depicts a data storage according to one or more embodiments.

FIG. 4 depicts a data storage according to one or more embodiments.

The data storage 30 can contain calculations of velocity 20, lengths of each joint of pipe 24 being run into and out of the wellbore, quantities of joints of pipe 26 run into and out of a wellbore, and total lengths of connected joints of pipe 28.

The data storage 30 can contain computer instructions 222 to instruct the computer processor to receive and store from the laser surface velocimeter: the length of each joint of pipe being run into and out of the wellbore, the quantity of joints of pipe run into and out of the wellbore, and the total length of connected joints of pipe being run into and out of the wellbore.

The data storage 30 can contain computer instructions 224 to instruct the computer processor to store x-ray diffraction information from the x-ray diffraction device and present the x-ray diffraction information on the display in real time.

The data storage 30 can contain magnetic field preset limits 602 used for producing an alarm when detected magnetic fields at the housing exceed the preset limits. In embodiments, the present limits can be preset limits known in the industry or preset limits set by the user of the system for a particular job.

The data storage 30 can have computer instructions 604 to instruct the computer processor to compare the detected magnetic field strength to the magnetic field preset limits.

The data storage 30 can have computer instructions 606 to instruct the computer processor to provide an alarm to the third party device when the detected magnetic field strength has exceeded the magnetic field preset limits.

Figure 5A:
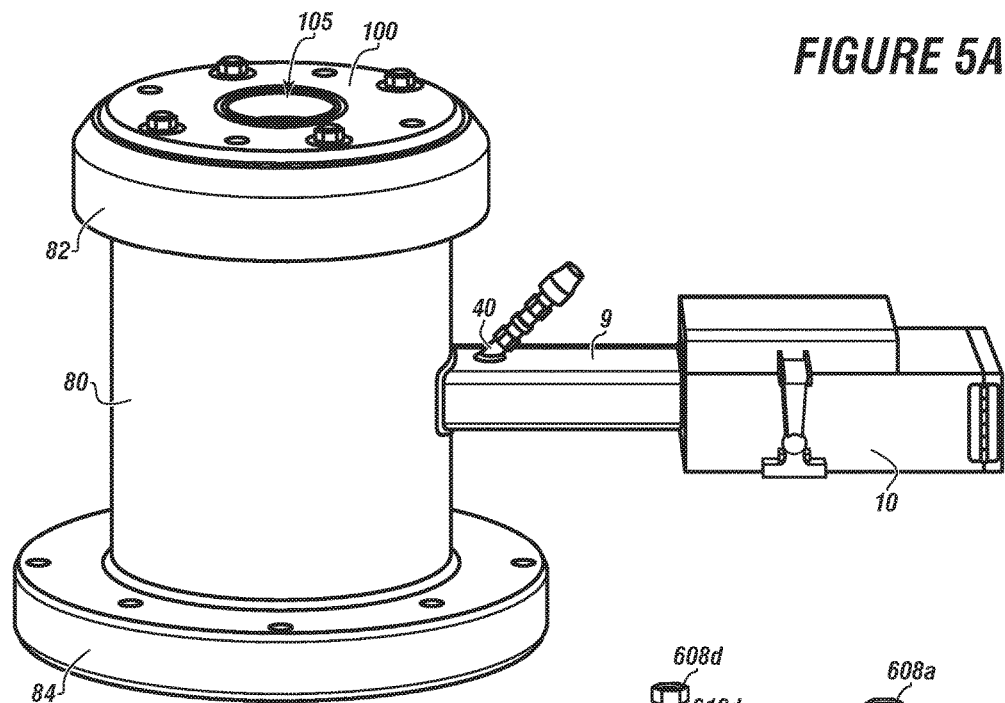
FIGS. 5A and 5B depict an upper mounting member according to one or more embodiments.
Figure 5B:
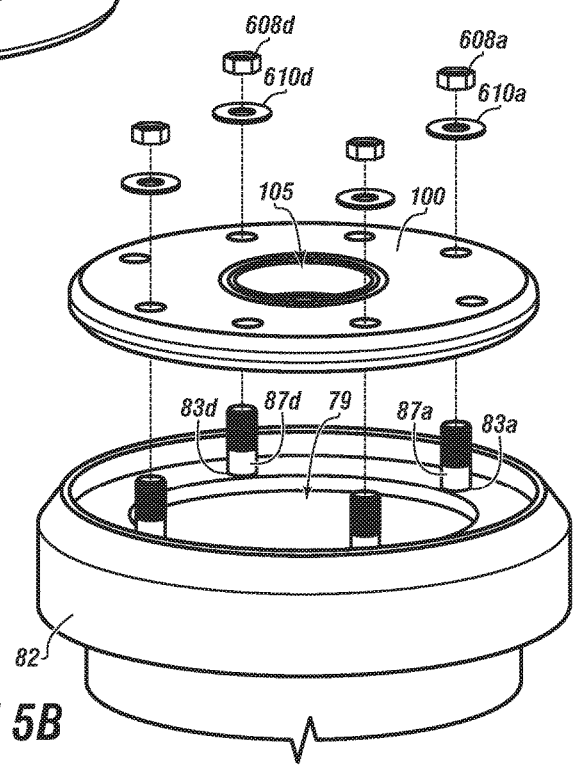

FIGS. 5A and 5B depict an upper mounting member according to one or more embodiments.

The upper mounting member 82 can be secured to the upper rubber pipe wiper 100. The upper rubber pipe wiper can be connected to the support member with a plurality of bolts 87a-87d mounted through bolt holes 83a-83d surrounding the center hole 79 of the support member 80.

In embodiments, the upper rubber pipe wiper 100 can have an upper wiper opening 105.

Bolts 608a-608d with washers 610a-610d can be used to hold the upper rubber pipe wiper 100 onto the plurality of bolts 87a-87d mounted in the bolt holes 83a-83d of the upper mounting member 82. In embodiments, the bolts can be any type of fastener known in the industry.

In embodiments, the laser housing 10 can be mounted longitudinally to the laser arm 9, which can be mounted to the support member 80, such as at a right angle. The pressurized gas port 40 can penetrate the laser arm 9.

In embodiments, the support member 80 can be connected to the lower plate 84.

FIG. 6 depicts a laser arm connected to a laser housing according to one or more embodiments.

The laser housing 10 with the laser arm 9 can be directly secured to the support member 80.

A rubber hood 620 can cover the first laser beam opening 7 in the support member 80 to prevent particulate, such as debris and well fluids, from penetrating the laser housing 10 with the hinged door 500. In embodiments, the rubber hood 620 can enable the laser beam 15 to pass unimpeded by debris and well fluids.

In embodiments, the rubber hood 620 can be made from rubber, plastic, metal or combinations thereof.

The laser arm 9 can have the second laser beam opening 11, which can be aligned with the first laser beam opening 7.

In embodiments, the laser measuring system can have a plurality of protection walls 300a-300c.

Each protection wall 300a-300c can be mounted within the laser arm 9, wherein each protection wall can have an aperture 302a-302c. Each aperture 302a-302c can be aligned with the first laser beam opening 7, the second laser beam opening 11, and a third laser beam opening 12.

Each protection wall 300a-300c can be configured to prevent debris from contacting a lens of the laser surface velocimeter 14.

In embodiments, from one to ten protection walls can be used.

In embodiments, the protection walls can be partial walls. Each partial wall can have an aperture.

In embodiments, each partial wall can be offset from another partial wall, so long as the apertures are aligned.

The protection walls can be welded, glued, or fastened to the interior walls, such as a top and a bottom of the laser arm or a top and a bottom of the laser housing.

In embodiments, each protection wall can have one or more apertures.

The laser arm 9 can be connected to the support member 80 at an angle from 81, such as an angle up to 90 degrees.

In embodiments, the pressurized gas port 40 can penetrate the laser arm 9 for providing a pressurized gas, such as air or nitrogen, into at least one of: the laser arm 9 and the laser housing 10, to increase gas pressure in the laser arm, the laser housing or both, by at least five percent above ambient pressure to ensure the laser beam openings are kept clear of debris generated by the wellbore or joint of pipe.

A cord housing 612 can be connected to the laser housing 10, which can be used for holding a power cord to engage the power supply to energize the laser measuring system.

Figure 7A:
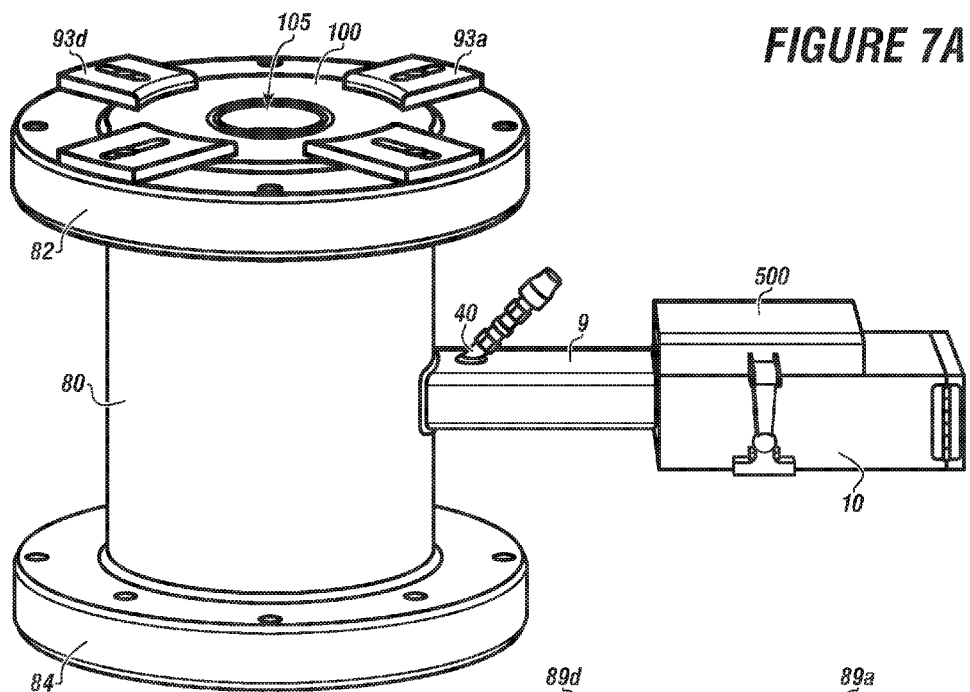
FIGS. 7A and 7B depict an upper rubber pipe wiper and upper mounting member according to one or more embodiments.
Figure 7B:
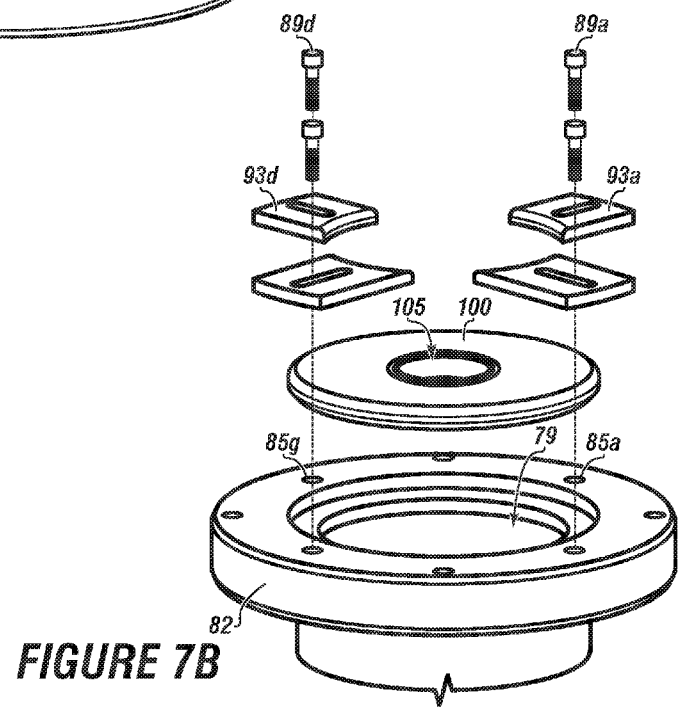

FIGS. 7A and 7B depict an upper rubber pipe wiper and upper mounting member according to one or more embodiments.

In embodiments, a plurality of clamps 93a-93d can be used to hold down the upper rubber pipe wiper 100 to the upper mounting member 82.

A plurality of clamp holes 85a-85g can be formed in the upper mounting member 82.

In embodiments, a plurality of fasteners 89a-89d, such as screws, can be installed into each clamp hole 85a-85g to retain one of the clamps 93a-93d.

The plurality of fasteners 89a-89d and plurality of clamps 93a-93d can secure the upper rubber pipe wiper 100 with the upper wiper opening 105 to the upper mounting member 82. The upper mounting member 82 can be affixed to the support member 80, which can have the center hole 79 aligned with the wellbore.

In embodiments, the support member 80 can be connected to the lower plate 84.

The upper rubber pipe wiper 100 can be configured to clean an outer surface of each joint of pipe as each joint of pipe is run into or out of the wellbore by pulling against the joint of pipe as the joint of pipe passes through the upper rubber pipe wiper 100.

The upper rubber pipe wiper 100 can have a thickness from one-fourth inch to four inches and a diameter from six inches to fifteen inches.

In embodiments, the laser housing 10 can engage the laser arm 9 and the hinged door 500. The laser housing 10 can have the pressurized gas port 40.

Figure 8:
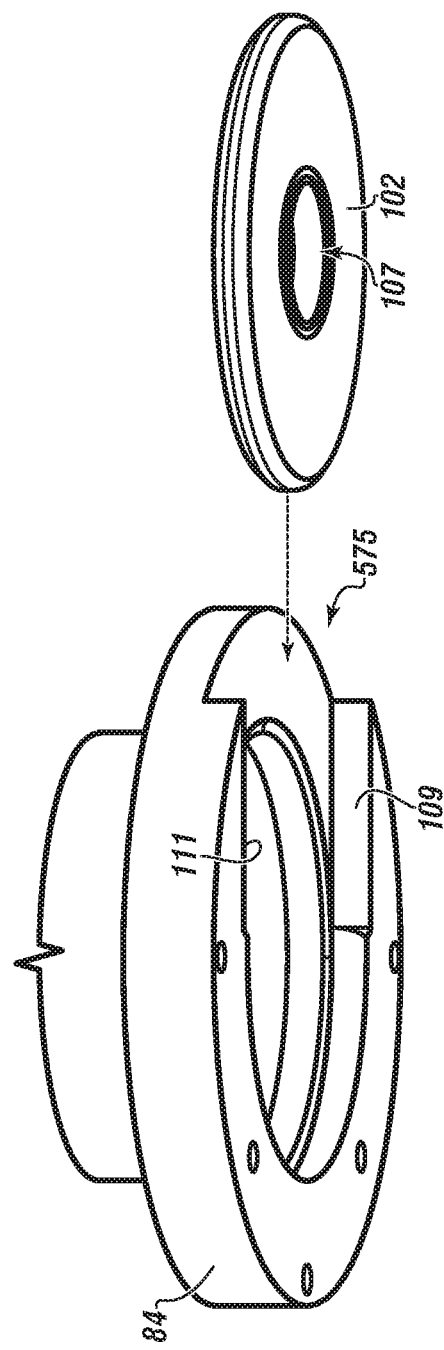
FIG. 8 depicts a lower rubber plate according to one or more embodiments.

FIG. 8 depicts a lower rubber plate according to one or more embodiments.

The lower rubber pipe wiper 102 can have a lower wiper opening 107, which can be connected to the lower plate 84.

In embodiments, the lower plate 84 can have a holder 575 for receiving and containing the lower rubber pipe wiper 102 on at least one side 109 of the lower rubber pipe wiper. In embodiments, the lower rubber pipe wiper can have a second side 111.

The lower rubber pipe wiper 102 can be slid into the holder 575 of the lower plate 84 for a faster install and replacement of the lower rubber pipe wiper. The lower plate 84 can be affixed to the support member opposite the upper mounting member.

While these embodiments have been described with emphasis on the embodiments, it should be understood that within the scope of the appended claims, the embodiments might be practiced other than as specifically described herein.

What is claimed is:

1. A laser measuring system for continuous measurement of at least one joint of pipe being inserted into or removed from a wellbore, the laser measuring system comprising:
   a. a support member having a center hole aligned with the wellbore, the center hole configured to receive the at least one joint of pipe, as the at least one joint of pipe is into and out of the wellbore, the support member having a first laser beam opening formed in the support member penetrating the center hole, the support member connected between an upper mounting member and a lower plate;
   b. an upper rubber pipe wiper with a upper wiper opening connected to the upper mounting member and a lower rubber pipe wiper with a lower wiper opening connected to the lower plate for cleaning the at least one joint of pipe between the upper mounting member and the lower plate;
   c. a laser arm comprising a second laser beam opening aligned with the first laser beam opening, the laser arm connected to the support member at an angle;
   d. a laser housing comprising a third laser beam opening, the third laser beam opening aligned with the second laser beam opening, the laser housing connected to and aligned with the laser arm;
   e. at least one protection wall mounted within the laser arm having an aperture aligned with the first laser beam opening, the second laser beam opening and the third laser beam opening;
   f. a laser surface velocimeter connected to a power supply, the laser surface velocimeter positioned in the laser housing and oriented to project a laser beam through the first laser beam opening, the second laser beam opening and the third laser beam opening sequentially, the laser surface velocimeter configured to:
      (i) measure lengths of the at least one joint of pipe being run into and out of the wellbore forming a length of each joint of pipe;
      (ii) count the at least one joint of pipe being run into and out of the wellbore forming a quantity of joints of pipe; and
      (iii) calculate a total length of connected joints of pipe;
   g. a computer processor in communication with the laser surface velocimeter;
   h. a data storage in communication with the computer processor, the data storage comprising:
      (i) computer instructions for instructing the computer processor to receive and store from the laser surface velocimeter:
         1. the length of each joint of pipe;
         2. the quantity of joints of pipe; and
         3. the total length of connected joints of pipe; and
   i. a display in communication with the computer processor for presenting the length of each joint of pipe, the quantity of joints of pipe, and the total length of connected joints of pipe in real time, wherein the upper rubber pipe wiper and the lower rubber pipe wiper simultaneously with the at least one protection wall ensure the laser beam has a debris-free and fluid-free reading surface on the at least one joint of pipe.

2. The laser measuring system of claim 1, wherein the upper mounting member comprising a plurality of bolt holes, each bolt hole configured to receive a bolt to secure the upper rubber pipe wiper to the upper mounting member, the upper rubber pipe wiper configured to clean an outer surface of the at least one joint of pipe as the at least one joint of pipe is run into or out of the wellbore.

3. The laser measuring system of claim 2, comprising a plurality of lower fastener holes formed through the lower plate for connecting the lower plate to wellhead equipment or providing a freestanding alignment with the wellbore above the wellhead equipment.

4. The laser measuring system of claim 1, wherein the upper mounting member has a plurality of clamp holes, each clamp hole configured to receive a fastener to retain a clamp, the clamp secures the upper rubber pipe wiper to the upper mounting member, the upper rubber pipe wiper configured to clean an outer surface of the at least one joint of pipe as the at least one joint of pipe is run into or out of the wellbore.

5. The laser measuring system of claim 1, comprising a pressurized gas port penetrating at least one of: the laser arm and the laser housing, providing a pressurized gas into at least one of: the laser arm and the laser housing, to increase gas pressure in the laser arm, the laser housing or the laser arm and the laser housing, by at least five percent above ambient pressure to ensure the first laser beam opening, the second laser beam opening and the third laser beam opening are kept clear of debris and wellbore fluid generated from the wellbore or the at least one joint of pipe.

6. The laser measuring system of claim 1, comprising an x-ray diffraction device for operation in tandem with the laser surface velocimeter, the x-ray diffraction device projecting an x-ray beam in tandem and simultaneously with the laser beam through the first laser beam opening, the second laser beam opening and the third laser beam opening at the at least one joint of pipe being inserted into or pulled from the wellbore, the x-ray diffraction device detecting fractures in the at least one joint of pipe while the at least one joint of pipe is being measured by the laser surface velocimeter, the x-ray diffraction device in communication with the computer processor and the data storage.

7. The laser measuring system of claim 6, wherein the data storage further comprising computer instructions to instruct the computer processor to store x-ray diffraction information from the x-ray diffraction device and present the x-ray diffraction information on the display in real time.

8. The laser measuring system of claim 1, comprising a remote control with a remote control processor and a remote control data storage, the remote control in communication with the laser surface velocimeter, the remote control data storage having computer instructions to instruct the remote control processor to remotely actuate the laser surface velocimeter via a network from a geographic location remote to the laser surface velocimeter.

9. The laser measuring system of claim 1, comprising at least one nozzle connected to the pressurized gas port, the at least one nozzle configured to project pressurized gas, causing movement of particulate in the laser housing and the laser arm, keeping the lens of the laser surface velocimeter free of debris and wellbore fluid and to keep the laser surface velocimeter cool.

10. The laser measuring system of claim 1, the laser housing further comprising a hinged door secured to the laser housing enabling access to the laser surface velocimeter.

11. The laser measuring system of claim 1, comprising at least one third party client device for receiving information from the computer processor for remote management operations of multiple laser measuring systems simultaneously.

12. The laser measuring system of claim 1, wherein the support member, the laser arm and the laser housing comprise a metal, a plastic, a rubber, or combinations thereof.

13. The laser measuring system of claim 1, wherein the power supply is a battery system.

14. The laser measuring system of claim 1, wherein the aperture has a diameter that is from five percent to ten percent larger than the diameter of the laser beam to reduce debris coming through the first laser beam opening, the second laser beam opening and the third laser beam opening.

15. The laser measuring system of claim 1, wherein the laser surface velocimeter comprises a a laser data storage connected to a laser processor with computer instructions to instruct the laser processor to compute the length of each joint of pipe being run into and out of the wellbore.

16. The laser measuring system of claim 1, comprising a magnetic field sensor secured to or installed proximate the laser surface velocimeter to detect magnetic field build up as the at least one joint of pipe is inserted into or removed from the wellbore, the magnetic field sensor in communication with the computer processor via a network.

17. The laser measuring system of claim 1, comprising a rubber hood covering the first laser beam opening in the support member, the rubber hood ensuring minimal particulate penetration to the laser surface velocimeter.

18. The laser measuring system of claim 1, wherein the lower rubber plate comprises a holder for receiving and containing the lower rubber pipe wiper on at least one side of the lower rubber pipe wiper.

* * * * *